June 23, 1925.
F. E. MARTIN
1,543,217
TAPERING MEANS FOR SAWMILL CARRIAGES
Original Filed Jan. 24, 1923   2 Sheets-Sheet 1
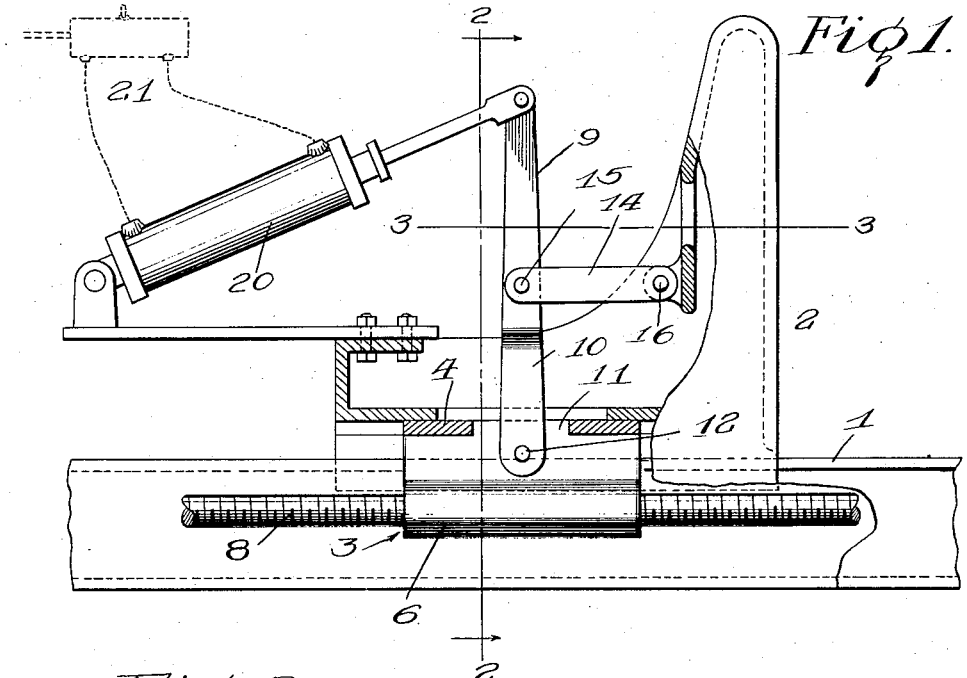
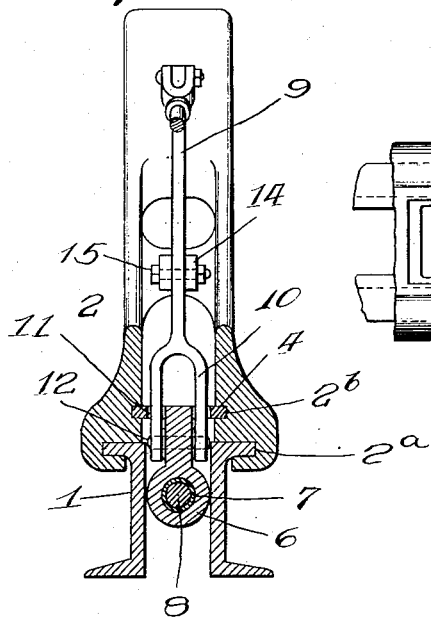
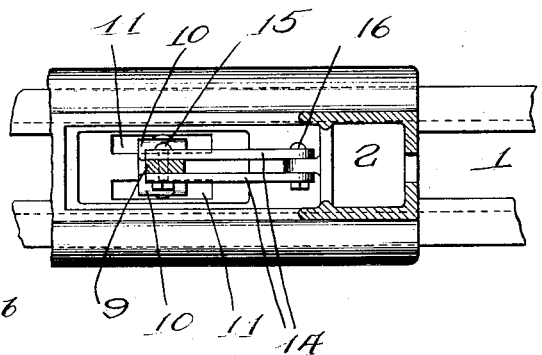
Inventor
F. E. Martin.
By
Attorney

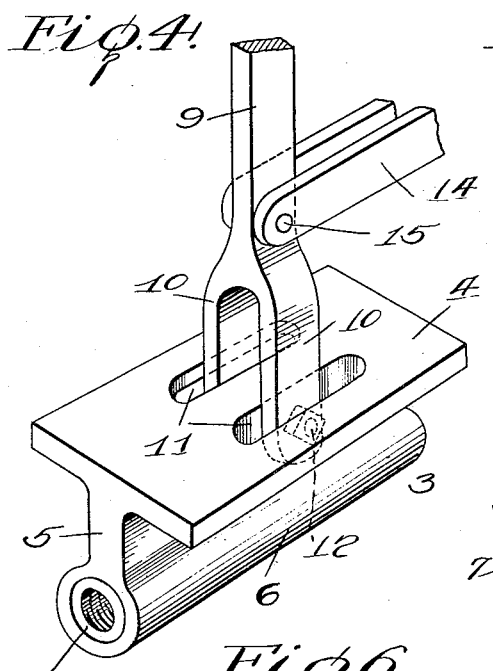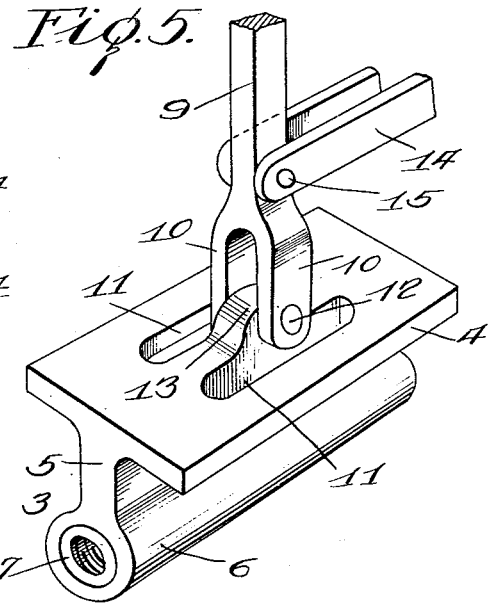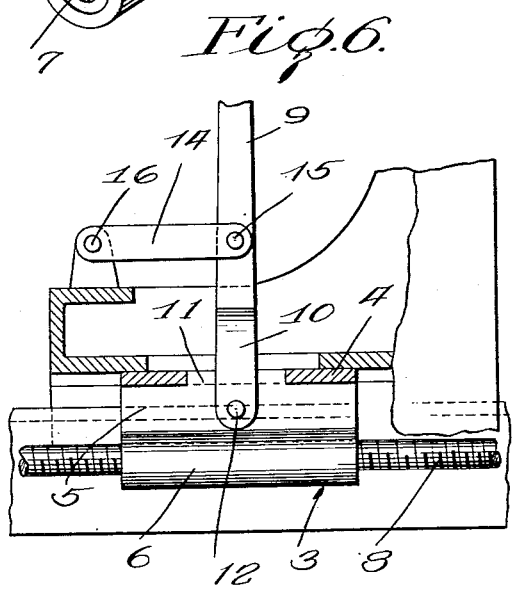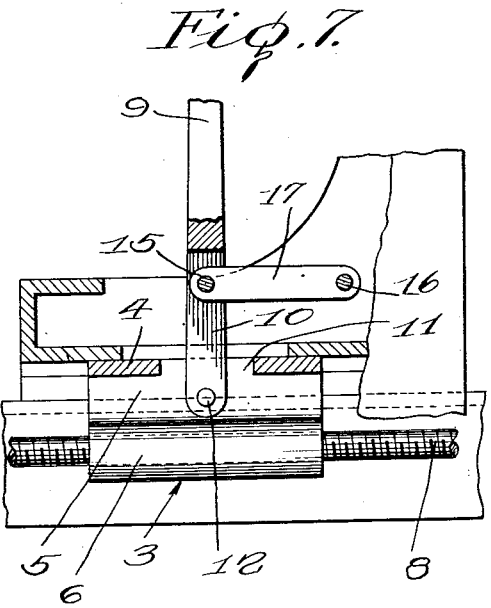

Patented June 23, 1925.

1,543,217

UNITED STATES PATENT OFFICE.

FREDERICK E. MARTIN, OF BERKELEY, CALIFORNIA, ASSIGNOR TO MARTIN AIR DOG COMPANY, OF SAN FRANCISCO, CALIFORNIA, A CORPORATION OF CALIFORNIA.

TAPERING MEANS FOR SAWMILL CARRIAGES.

Application filed January 24, 1923, Serial No. 614,686. Renewed April 10, 1925.

*To all whom it may concern:*

Be it known that I, FREDERICK E. MARTIN, citizen of the United States, residing at Berkeley, in the county of Alameda and State of California, have invented certain new and useful Improvements in Tapering Means for Sawmill Carriages, of which the following is a specification.

This invention relates to a taper connection for the knees of saw mill carriages, wherein the nut carrier or rack, as the case may be, for the set works adjustment of a knee is so mounted as to permit of a knee being moved with respect to the nut carrier or rack, the usual operable taper lever being pivoted directly to the nut carrier or rack and connected directly to the knee by a link.

It has been heretofore proposed to provide for knee adjustment through the use of a lever and link connection, particularly where a screw and a nut are employed to move the knee, but in such construction the space available for the installation of the links is so small that the links have to be constructed of such light material as to be extremely liable to breakage in use, hence in actual practice, link connections for this purpose are not employed.

In the manufacture and use of the taper mechanism described more particularly in my co-pending applications Numbers 517,647, November 25th, 1921, and 569,854, June 21st, 1922, I have found it is absolutely necessary to rearrange the connection between the knees and the nut carrier or rack to provide, first, space to permit the use of material having sufficient strength to stand the blow incident to the power which actuates the knee in a tapering operation, and second, leverage arrangement to provide the desired movement incident to that required in the use of the mechanism disclosed in said applications. I have found it wholly impractical to install the improved mechanism of the above noted applications on carriages employing nuts and screw operating means actuated by the setting mechanism as ordinarily arranged, and where installation has taken place, it has required entire reconstruction of the parts. Therefore, with a view to providing for power tapering as contemplated in my applications for patents, and so arrange the elements that sufficient space is available for parts of requisite strength, the present construction has been designed. To accomplish this result, the taper lever is pivotally connected directly to the nut carrier or rack, and in turn, it is connected above said carrier or nut rack to the knee by a link or links.

While the invention is particularly designed to meet the condition brought about by the use of the screw and nut employed to adjust the knee, it may also be used with advantage when a rack and pinion are arranged for knee adjustment.

The invention is illustrated in the accompanying drawings, in which:—

Figure 1 is a side elevation of a knee, partly in section illustrating the invention.

Figure 2 is a vertical section on the line 2—2 of Figure 1.

Figure 3 is a horizontal section on the line 3—3 of Figure 1.

Figure 4 is a detail perspective view of a nut carrier and taper lever, constructed in accordance with my invention.

Figure 5 is a similar view of a slight modification.

Figure 6 is a vertical section illustrating a different form of the invention.

Figure 7 is a similar view of a further modification.

In the drawing, 1 indicates a head-block, 2 a knee, channeled at 2$^a$ to slidably engage the ribs of the knee block, and further channeled at 2$^b$ to receive the usual type of nut carrier 3, or rack, if a pinion be used. The nut carrier is formed with a shelf portion 4, the edges of which slidably fit in the channels 2$^b$, and depending from the shelf is a central web 5 and a lower cylindrical portion 6, in which is arranged a nut 7 for cooperation with the usual screw shaft 8, whereby the nut carrier, hence the knee, are movable in response to the operation of the set works.

In carrying out the present invention, the taper lever 9 is preferably bifurcated at its lower end, the bifurcated extensions 10 extending through slots 11 in the shelf 4 of the screw carrier, and are pivotally connected to the web 5 below the shelf, as at 12. If desired, however, and if circumstances permit, that portion of the screw carrier intermediate the slots 11 may be increased as at 13 to form an ear for the pivot pin 12, to compensate in strength for the material cut therefrom in forming the slots, as shown in Figure 5. Above the nut carrier, the lever is connected to the knee by links 14 pivotally connected to the lever at 15 and to the knee at 16. By preference, these links extend forwardly from the lever, that is, towards the face of the knee, though under unusual circumstances of construction, they may project rearwardly as indicated in Figure 6. Furthermore, if it is found necessary to increase the leverage without lengthening the taper lever to an unreasonable extent, a single link 17 as indicated in Figure 7 may be used. Under these circumstances, the bifurcated end of the lever may be increased in height and the link 17 pivoted within one of the arms of the fork, as shown in Figure 7.

This connection for tapering the knee is to be distinguished from a connection in which all of the knees are moved simultaneously through lever and link connections for the purpose of receding the log from the plane of the saw on the return movement of the carriage, as this operation is performed automatically and moves all blocks simultaneously. In the present construction, the movement of a knee with respect to the nut carrier for tapering purposes, is entirely within the control of the operator through manipulation of the lever 9, by the power mechanism. At the same time the mechanism affords sufficient stability to lend the requisite strength to the parts when moving the knees and screw carriers together in the usual setting operation.

While the invention is particularly designed for a power tapering operation, it is evident the lever 9 may, if desired, be associated with a quadrant and locking means for manual operation. Under such circumstances however, the stresses and strains are not so great as when tapering by power, nevertheless the invention is susceptible to manual as well as power actuation.

Where a screw is used to effect a tapering operation through the medium of the set shaft, the improvement described has its greatest significance and importance. When the taper lever is held in normal position by pressure in the cylinder 20 carried by the knee, the links and pivots form a substantially rigid construction between the nut carrier, knee and lever, hence when the knee is adjusted in the setting operation by the valve control 21, indicated in dotted lines in Figure 1, a positive movement of the knee is effected, and so in any tapering position of the knee, the parts likewise will be rigidly set and held in adjusted relation. The position of the links therefore serves an important function in the organization of the elements, not only because of the security afforded in providing the necessary strength of material, but lending to the possibility of use of the screw means for tapering purposes.

It is to be particularly noted that the lower end of the lever has a pivotal connection directly with the nut carrier as indicated at 12, and that this pivotal connection does not change its relation with the nut carrier in the tapering operation. Hence, the pivotal connection moves with the nut carrier at all times in a straight line in parallelism with the knee movement and along the line of maximum resistance of the nut carrier to strains; in other words directly longitudinal of the screw. The connection of the power means with the upper end of the lever is such that this upper end forms the sole compensation in the changes of vertical distance between the upper and lower ends of the lever, as the latter is operated. That is to say, this upper end of the lever moves downwardly or upwardly to compensate for the change in vertical distance between the pivot 12 and the upper end of the lever as the free end of the latter travels in its arcuate path when operated. Thus the link, in any given movement of the lever, will travel a greater distance than if both ends of the lever were capable of vertical compensating movement. Furthermore, as the fixed lower pivot of the lever remains at all times in a predetermined relation to the nut carrier, the resistance to strains on the mechanism, through the jar of the log or the like, is more readily provided for. In any change in position of the lever from the vertical, the link assumes an angular relation with that portion of the lever between the link and nut carrier, and this angular relation, as both the pivots 12 and 16 are immovable, directs the strain largely onto the pivot 12. It is therefore of importance that the pivotal lower end of the lever move at all times in a straight line of parallelism with the movement of the knee, without at any time changing its relation to the nut carrier.

What I claim is:—

1. A tapering means for saw mill carriages, comprising in combination a knee adapted for sliding movement relative to the head-block, a nut carrier adapted for adjusting movement in a straight line in parallelism with the movement of the knee, a power means, a lever having pivotal connection at the lower end with the nut carrier, whereby said lower end of the lever is movable with the nut carrier at all times in a straight line in parallelism with the knee adjustment, a link connecting the lever above the the nut carrier with the knee, and means whereby the power means may operate upon the upper end of the lever in both directions, the relation of the power means and upper end of the lever providing for the sole compensation in the changing vertical distance between the upper and lower ends of the lever as the lever is operated.

2. A tapering means for saw mill carriages, comprising in combination a knee adapted for sliding movement relative to the head block, an element adapted for adjusting movement in a straight line in parallelism with the movement of the knee, a power means, a lever having pivotal connection at the lower end with the said element, whereby said lower end of the lever is movable with the element at all times in a straight line in parallelism with the knee adjustment, a link connecting the lever above the element with the knee, and means whereby the power means may operate upon the upper end of the lever in both directions, the relation of the power means and the upper end of the lever providing for the sole compensation in the changing vertical distance between the upper and lower ends of the lever as the lever is operated.

In testimony whereof I affix my signature.

FREDERICK E. MARTIN.